(12) United States Patent
Nakamura et al.

(10) Patent No.: US 7,815,246 B2
(45) Date of Patent: Oct. 19, 2010

(54) SEALING STRUCTURE FOR CABIN (75) Inventors: Norimi Nakamura, Sakai (JP);
Shinichiro Saji, Sakai (JP); Takeshi Tsuchiya, Sakai (JP); Masanori Fujino, Sakai (JP)

(73) Assignee: Kubota Corporation, Osaka (JP)

( * ) Notice: Subject to any disclaimer, the term of this patent is extended or adjusted under 35 U.S.C. 154(b) by 390 days.

(21) Appl. No.: 11/853,508

(22) Filed: Sep. 11, 2007

(65) Prior Publication Data

US 2008/0084091 A1    Apr. 10, 2008

(30) Foreign Application Priority Data

Oct. 10, 2006    (JP) ............................. 2006-276273

(51) Int. Cl.
    *B60R 13/07*    (2006.01)
(52) U.S. Cl. .................................. 296/190.08; 296/213
(58) Field of Classification Search ................ 49/475.1, 49/476.1, 484.1, 489.1, 495.1, 499.1; 296/154, 296/190.08, 206, 210, 213, 218
    See application file for complete search history.

(56) References Cited

U.S. PATENT DOCUMENTS

| | | | | |
|---|---|---|---|---|
| 2,667,951 A | * | 2/1954 | Gall ....................... | 52/204.595 |
| 3,118,701 A | * | 1/1964 | Peras ........................... | 296/93 |
| 3,624,963 A | * | 12/1971 | Osteen et al. ................ | 49/394 |
| 4,094,545 A | * | 6/1978 | Kramer ................. | 296/190.08 |
| 4,495,234 A | * | 1/1985 | Tominaga et al. ........... | 428/122 |
| 4,592,586 A | * | 6/1986 | Yagami et al. ............... | 296/218 |
| 4,618,181 A | * | 10/1986 | Tokuda et al. ................ | 296/191 |
| 4,728,145 A | * | 3/1988 | Benedetto .................... | 296/213 |
| 4,772,065 A | * | 9/1988 | Nakata et al. ................ | 264/279 |
| 5,553,428 A | * | 9/1996 | Watanabe et al. ............. | 52/208 |
| 5,553,913 A | * | 9/1996 | Nabuurs ................ | 296/216.09 |
| 6,592,177 B1 | * | 7/2003 | Mathew ....................... | 296/210 |
| 6,869,137 B2 | * | 3/2005 | Schonebeck ................ | 296/210 |
| 2001/0003400 A1 | * | 6/2001 | Grimm et al. ............... | 296/210 |
| 2004/0094992 A1 | * | 5/2004 | Bohm et al. ................ | 296/210 |

FOREIGN PATENT DOCUMENTS

| | | | |
|---|---|---|---|
| DE | 4038281 A1 | * | 6/1992 |
| EP | 56828 A2 | * | 8/1982 |
| GB | 2104008 A | * | 3/1983 |
| JP | 59190043 A | * | 10/1984 |
| JP | 60261785 A | * | 12/1985 |
| JP | 62012476 A | * | 1/1987 |
| JP | 62039372 A | * | 2/1987 |
| JP | 62083218 A | * | 4/1987 |
| JP | 62214033 A | * | 9/1987 |
| JP | 62283031 A | * | 12/1987 |

(Continued)

*Primary Examiner*—Glenn Dayoan
*Assistant Examiner*—Paul A Chenevert
(74) *Attorney, Agent, or Firm*—The Webb Law Firm (57) ABSTRACT

A cab includes a cab frame forming the cab, an outer roof configured to cover the cab frame from above and to be fastened to the cab frame from above, a seal mount protruding downwardly from an edge of the outer roof, and a seal material including a body portion having a recess for receiving the seal mount. The periphery of the body portion of the seal material has a seal lip for contacting the cab frame for sealing, and a drain groove for draining water entering between the seal material and the cab frame.

13 Claims, 6 Drawing Sheets

FOREIGN PATENT DOCUMENTS

| | | | |
|---|---|---|---|
| JP | 01262269 A | * | 10/1989 |
| JP | 2058508 U | | 4/1990 |
| JP | 02124314 A | * | 5/1990 |
| JP | 06144290 A | * | 5/1994 |
| JP | 08133123 | | 5/1996 |
| JP | 11036696 A | | 2/1999 |
| JP | 11091639 | | 4/1999 |

* cited by examiner

SEALING STRUCTURE FOR CABIN

BACKGROUND OF THE INVENTION

This invention relates to a cabin, and more particularly to a seal structure for a vehicle cabin.

A known seal structure for a cabin (referred to as cab), as disclosed in JP 8-133123, for example, has an outer roof tightened from above to a cab frame through a seal member to seal a gap between the outer roof and cab frames. Another known seal structure for a cab, as disclosed in JP 11-91639, a seal material is fitted in an elastically deformed state between a peripheral portion of a top board and a top board support to seal a gap between the top board and a cab frame.

In the conventional seal structure for a cab disclosed in JP 8-133123, the outer roof is tightened and fixed from above, and its tightening force presses the seal member on the cab frame, thereby securing sealing performance between the outer roof and cab frame. However, the seal member performs sealing action in only one location. When, for example, the seal member becomes depleted or the tightening force weakens, there arises a problem that water can easily leak into the cab.

In the conventional seal structure for a cab disclosed in JP 11-91639, the seal material is elastically deformed, and a restoring force of the elastic deformation is used to secure sealing performance between the top board and cab frame. However, the restoring force due to the elastic deformation of the seal material is weak. When, for example, the seal material becomes depleted, there arises a problem that water can easily leak into the cab.

SUMMARY OF THE INVENTION

The object of this invention is to realize a seal structure for a cab that produces improved sealing performance between an outer roof and a cab frame.

A cab according to this invention comprises:

a cab frame forming the cab;

an outer roof configured to cover said cab frame from above and to be fastened to the cab frame from above;

a seal mount protruding downwardly from an edge of the outer roof; and a seal material including a body portion having a recess for receiving the seal mount, a periphery of the body portion of the seal material having a seal lip for contacting said cab frame for sealing, and a drain groove for draining water entering between said seal material and said cab frame.

According to this characteristic, drain grooves are formed laterally of the body portion of the seal material for draining water entering between the seal material and the cab frame. The water entering between the seal material and the cab frame can be drained smoothly through the drain grooves. Thus, water is prevented from stagnating between the seal material and the cab frame.

The body portion and seal lips of the seal material have sealing effects in two locations between the outer roof and cab frame. This improves sealing performance between the outer roof and cab frame.

That is, according to this invention, since water is prevented from stagnating between the seal material and cab frame, water can hardly enter the cab from between the seal material and cab frame, thereby improving sealing performance between the outer roof and cab frame.

DETAILED DESCRIPTION OF PREFERRED EMBODIMENTS

[Overall Construction of Utility Vehicle]

Figure 1:
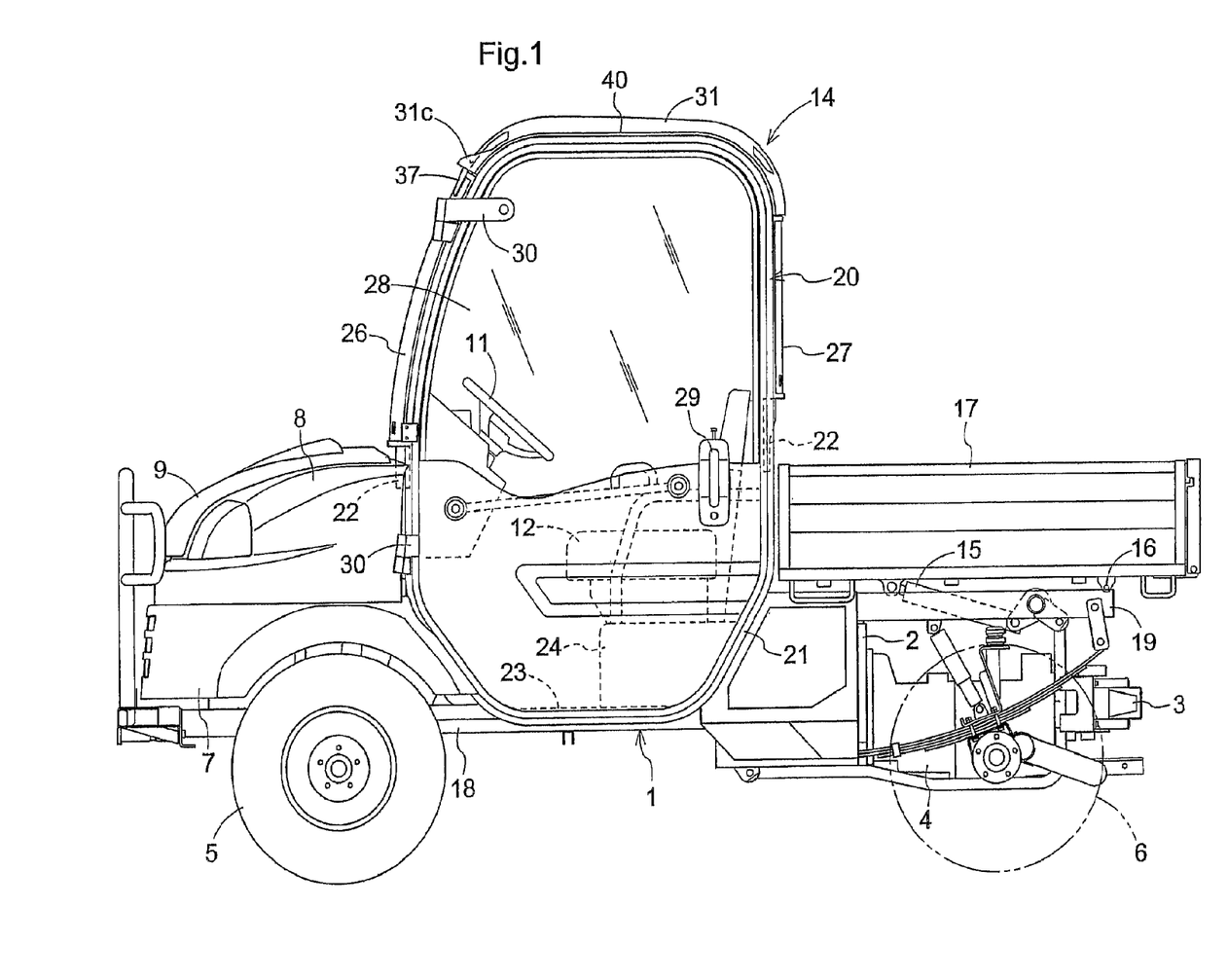
FIG. 1 is a left-hand side elevation of a utility vehicle.
Figure 2:
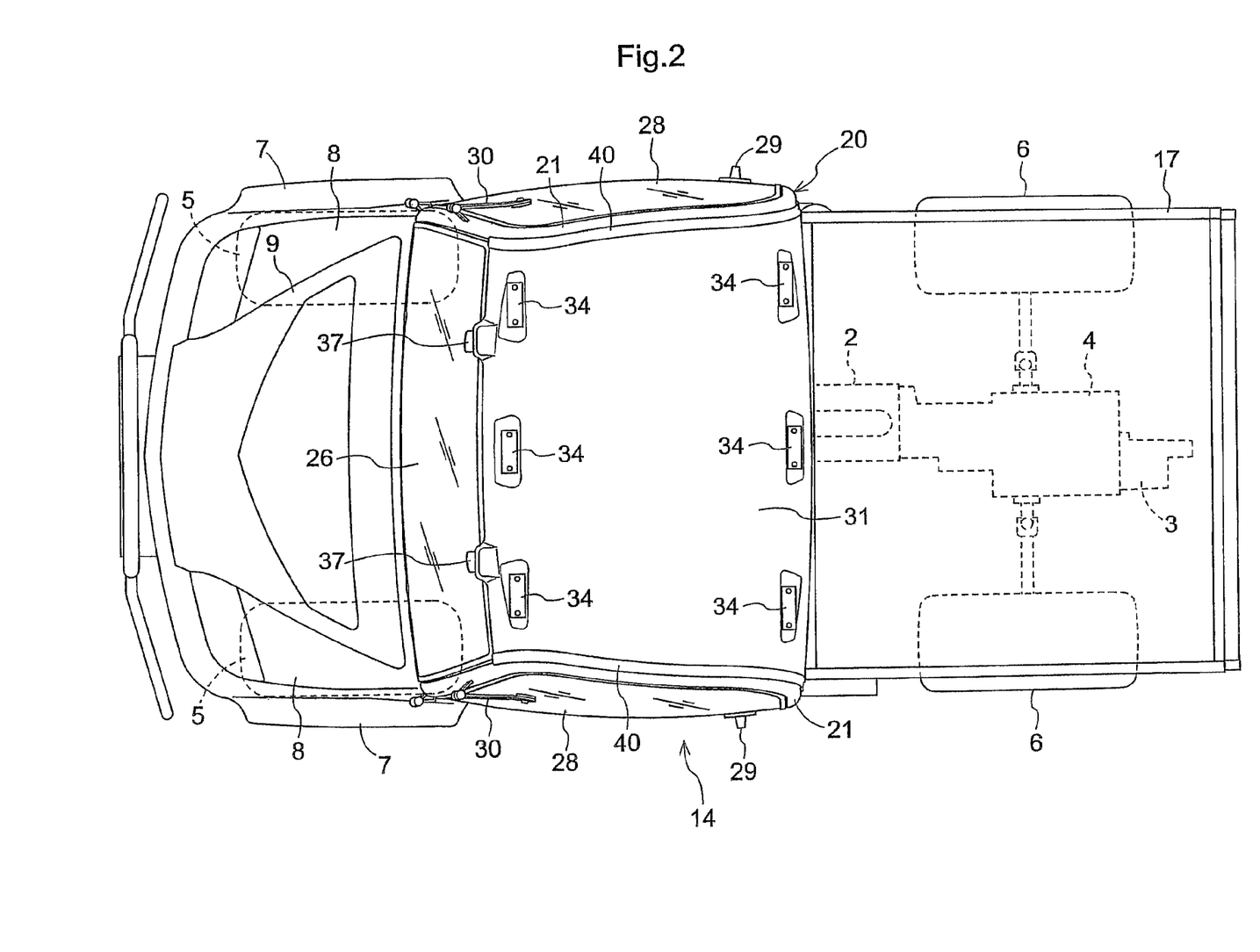
FIG. 2 is a plan view of the utility vehicle.

FIG. 1 shows a side elevation of a utility vehicle which is one example of working vehicles. FIG. 2 shows a plan view of the utility vehicle. The utility vehicle is constructed to be the four-wheel drive type for transmitting power from an engine 2 mounted in a vibration-proofing manner on a vehicle body frame 1, through a gear type change speed device 4 and a hydrostatic step less transmission 3, to right and left front wheels 5 and right and left rear wheels 6.

As shown in FIGS. 1 and 2, the utility vehicle includes, arranged on a front part thereof, lower covers 7 acting also as front wheel fenders, an upper cover 8 opening in an upper, transversely middle portion thereof, and a hood 9 pivotably open able and closable to open ably cover the opening of the upper cover 8.

The utility vehicle includes a cab 14 disposed in a longitudinally middle position thereof and having a steering wheel 11 for steering the front wheels 5, and a driver's seat 12. The cab 14 defines a boarding space therein.

A hydraulic dump cylinder 15 is disposed in a rearward position of the utility vehicle and above the gear type change speed device 4. The dump cylinder 15 is extendible and contractible for vertically rocking a loading platform 17 to take dumping action about a pivot shaft 16 extending transversely in a rear end unit region of the vehicle body frame 1.

The vehicle body frame 1 includes a cab frame 20 for forming the boarding space, and a front frame 18 and a rear frame 19 extending forward and rearward from the cab frame 20. The various frames 18, 19, 20 and so on constituting the vehicle body frame 1 are firmly connected together by welding.

The cab frame 20 includes a pair of right and left door frames 21 each defining an entrance, a plurality of cross members 22 extending between the right and left door frames 21, a floor panel 23 defining a floor of the boarding space, a support frame 24 for supporting the driver's seat 12, and front and rear roof panels 25 (FIG. 3) for supporting an outer roof 31 and an inner roof 36 forming a ceiling of the boarding space. A front plane and a rear plane of the cab frame 20 are covered with an open able windshield 26 and an open able rear glass pane 27, respectively.

Figure 5:
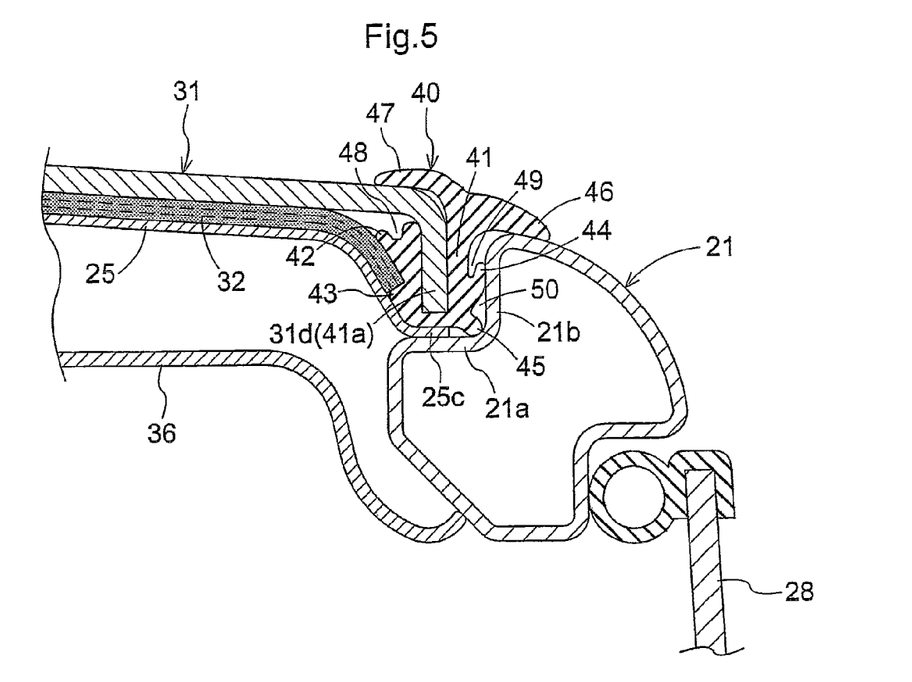
FIG. 5 is a vertical section taken on line V-V of FIG. 3.

The pair of right and left door frames 21 each defining an entrance is formed by bending a square steel pipe into a loop shape. Each door frame 21 has an upper inner portion recessed over the entire circumference thereof. The recess defines a frame receiver 21*a* and a seal portion 21*b* (FIG. 5).

The door frames 21 located at opposite sides of the cab frame 20 have doors 28. When an open/close handle 29 is operated from inside or outside, each of the right and left doors 28 of the outswinging type opens and closes in a single swing mode about a vertical axis of hinges 30 disposed in upper and lower positions at the front of the door 28.

[Detailed Construction of Outer Roof and Adjacent Components]

Figure 3:
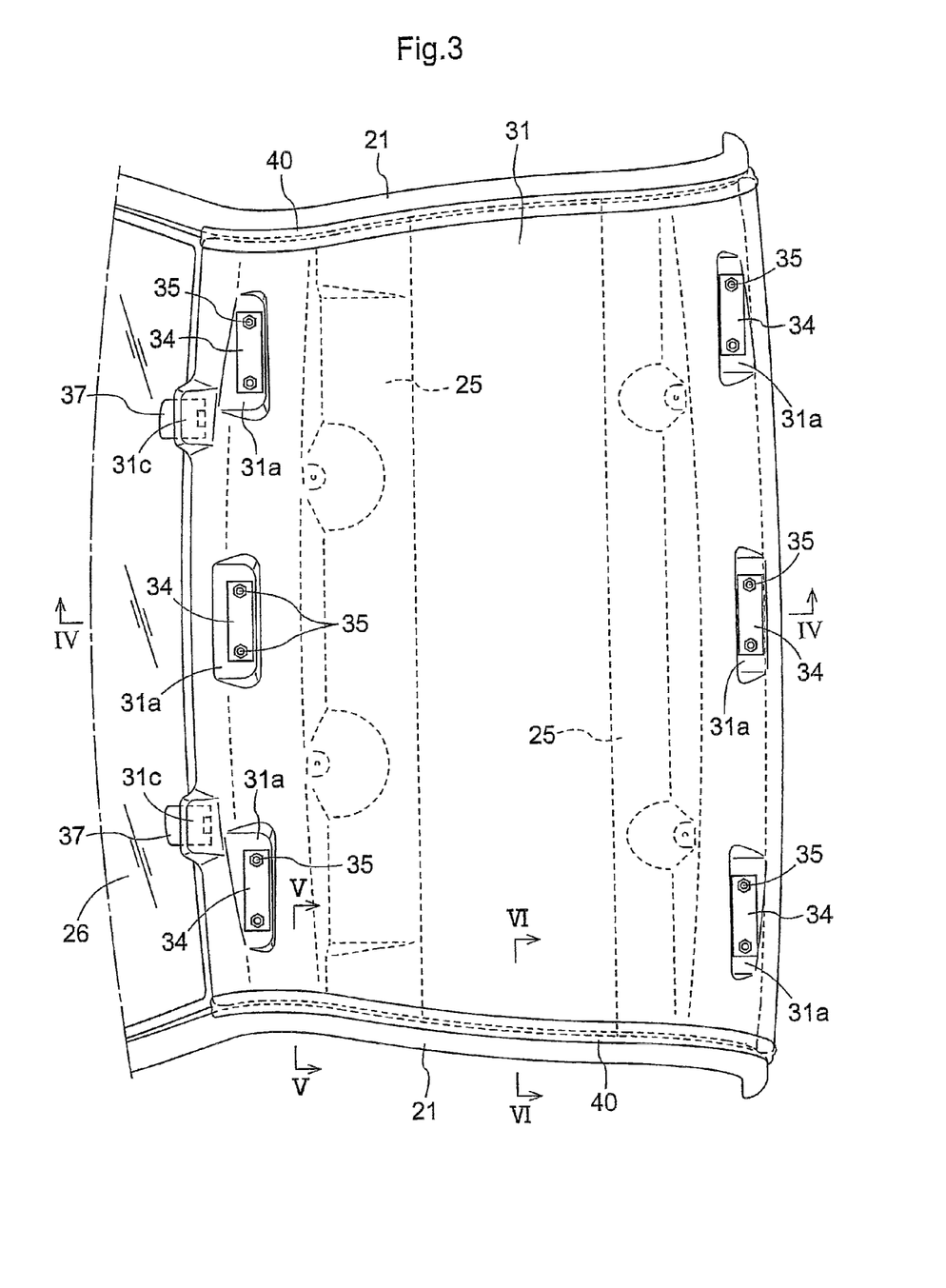
FIG. 3 is a plan view of an outer roof.
Figure 4:
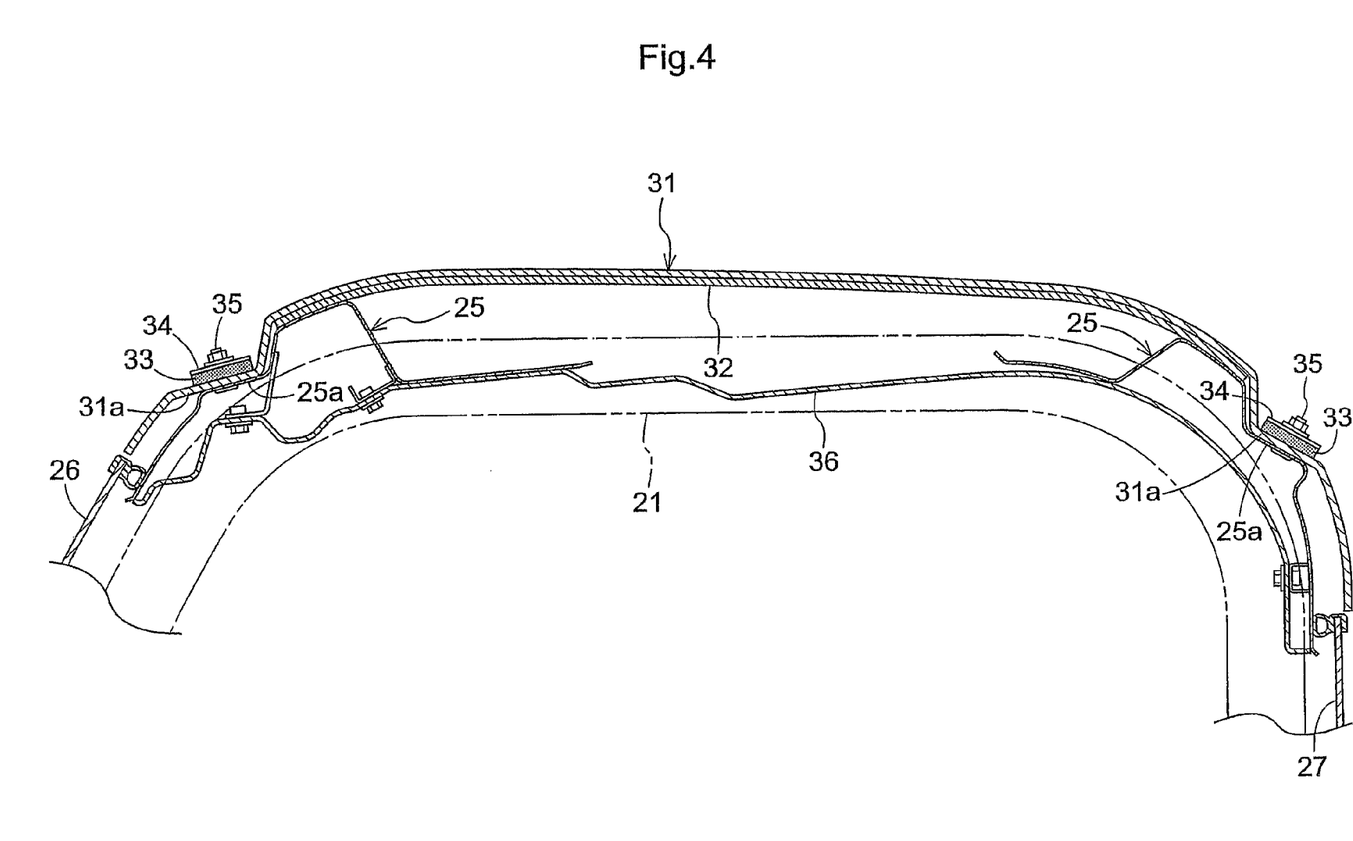
FIG. 4 is a vertical section taken on line IV-IV of FIG. 3.

FIG. 3 is a plan view showing the construction of the outer roof 31 and adjacent components. FIG. 4 is a section taken on line IV-IV of FIG. 3. As shown in FIGS. 3 and 4, the front and rear roof panels 25 are formed to have shapes fitting with the outer roof 31 and inner roof 36 to be described hereinafter, respectively. Front parts of the front roof panel 25 and rear parts of the rear roof panel 25 are dented inward to form recesses 25a, and bolts 35 are fixed to the recesses 25a for attaching the outer roof 31.

The front and rear roof panels 25 have flange portions 25c extending over the entire lengths of the right and left sides thereof. The roof panels 25 are secured to the door frame 21, with the Range portions 25c placed on the frame receivers 21a of the door frame 21 (FIG. 5).

The outer roof 31 is constructed by pressing an ABS resin plate and coating the outer surface with acrylic sheet. The outer roof 31 has front parts and rear parts dented downward to form recesses 31a. Mounting bores are formed in the recesses 31a for receiving the bolts 35 therethrough to attach the outer roof 31. The outer roof 31 has hinge mounts 31c projecting upward from the front end thereof. In this way, the outer roof 31 covers, from above, hinges 37 at the upper end of the windshield 26. Thus, the hinges 37 do not rust easily, and appearance is improved also.

The opposite sides of the outer roof 31 are bent downward over the entire lengths thereof to form seal mounts 31d. A seal material 40 is attached to each seal mount 31d as described hereinafter (FIG. 5). The seal material 40 is attached to each seal mount 31d of the outer roof 31 to extend between a front end and a rear end of the seal mount 31d. The seal material 40 has a front end and a rear end thereof exposed outside the vehicle to drain water such as rain water outside the vehicle through drain grooves 48-50 described hereinafter.

As shown in FIG. 4, the door frame 21 and outer roof 31 are curved forward and backward, so that the drain grooves 48-50 formed in the seal material 40 may be inclined forward and backward. Thus, by effectively using such inclinations water can be drained smoothly forward and backward.

The outer roof 31 has a sound-absorbing waterproof sheet 32 pasted to an entire area of the lower surface thereof. The sound-absorbing waterproof sheet 32 has a three-layer structure including a sound-absorbing waterproof sponge, a sound insulation sheet and a sound-absorbing waterproof sponge (FIG. 5). Even when water enters areas over upper surfaces of the roof panels 25 through the seal materials 40 from the outer roof 31, the water is absorbed by the sound-absorbing waterproof sheet 32. In addition, sound from outside the vehicle is absorbed by the sound-absorbing waterproof sheet 32, and thus is hardly transmitted to the interior of the cab 14.

The outer roof 31, with the seal materials 40 attached thereto, is placed in tight contact with the front and rear roof panels 25, and is fastened tight to the roof panels 25 from above through rubber plates 33 and presser plates 34 after positionally adjusting the bolts 35 of the roof panels 25 and the mounting bores in the recesses 31a of the outer roof 31. By employing the construction for fastening from above the outer roof 31 with the seal materials 40 attached to the peripheral portions thereof the efficiency of assembling work can be improved and manufacturing cost reduced.

The construction for fastening the outer roof 31 from above to the front and rear roof panels 25, with the sound-absorbing waterproof sheet 32 interposed between the outer roof 31 and roof panels 25, the force fastening the outer roof 31 tight acts as a force that presses the sound-absorbing waterproof sheet 32 adhering to the outer roof 31 against the front and rear roof panels 25, to secure sealing performance between the front and rear parts of the outer roof 31 and the roof panels 25.

When, for example, the utility vehicle moves forward, water may enter from a space between the windshield 26 and the front end of the outer roof 31, backward into the space between the outer roof 31 and roof panels 25. Even so, the water is absorbed by the sound-absorbing waterproof sheet 32 interposed between the outer roof 31 and roof panels 25, thereby preventing the water from entering the cab 14. In this way, sealing performance is secured for the space between the front end of the outer roof 31 and roof panel 25. When water enters from a space between the rear glass pane 27 and the rear end of the outer roof 31, the sound-absorbing waterproof sheet 32 similarly secures sealing performance for the space between the rear end of the outer roof 31 and roof panel 25.

Below the roof panels 25, the inner roof 36 is fixed to cover an entire ceiling area of the cab 14, the inner roof 36 being formed of a heat insulator and a nonwoven fabric curved to fit with the shape of the roof panels 25. The inner roof 36 serves to keep the temperature and the like in the cab 14 comfortable.

[Detailed Construction of Seal Material]

Figure 6:
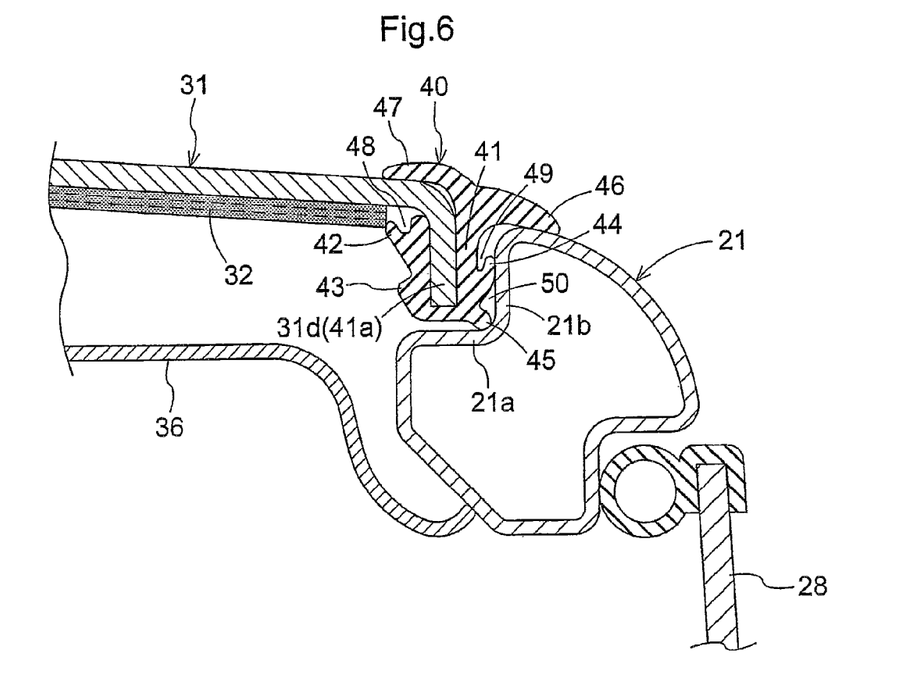
FIG. 6 is a vertical section taken on line VI-VI of FIG. 3.
Figure 7:
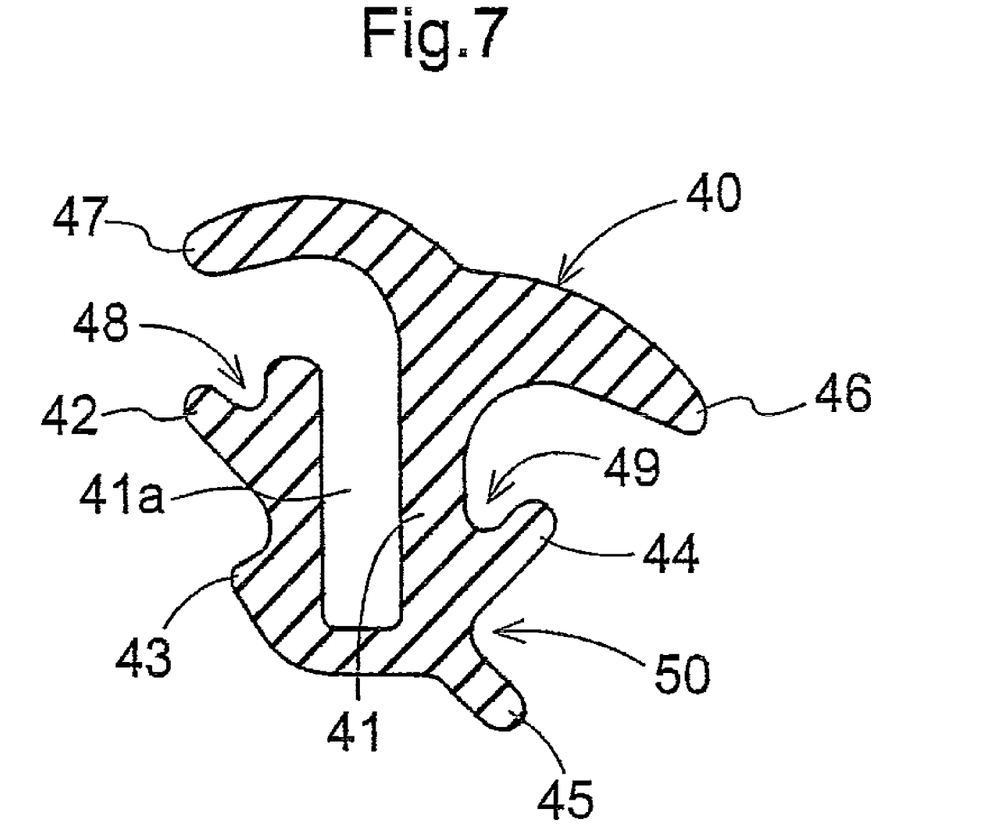
FIG. 7 is a detailed view showing a sectional structure of a seal material.

FIGS. 5 through 7 show a detailed construction of the seal material 40.

FIG. 5 shows a section taken on line V-V of FIG. 3, with the seal material 40 attached. FIG. 6 shows a section taken on line VI-VI of FIG. 3, with the seal material 40 attached. FIG. 7 shows a section of the seal material 40 not attached. FIGS. 5 through 7 show a seal structure on the left-hand side of the outer roof 31. A right-hand seal structure is the same except the right and left features. FIG. 5 shows a seal structure at the opposite sides of the front roof panel 25. A seal structure at the opposite sides of the rear roof panel 25 is similar to what is shown in FIG. 5 (see FIG. 3).

As shown in FIGS. 5 through 7, the seal material 40 is formed of EPDM (Ethylene Propylene Diene Methylene Linkage), has a sectional shape defining, as integral parts thereof, seal lips 42-45 and first and second tongues 46 and 47 to be described hereinafter.

The seal material 40 includes a body portion 41 attachable to the outer roof 31, seal lips 42-45 formed on inward and outward sides of the body portion 41, and first and second tongues 46 and 47 extending upward from the body portion 41.

As shown in FIGS. 5 and 7, the body portion 41 of the seal material 40 has a channel-shaped section opening upward, defining an upwardly opening recess 41a extending over the entire length of the seal material 40. When the outer roof 31 is fixed from above, with the seal material 40 attached to the outer roof 31, a lower surface of the body portion 41 is placed in tight contact with the upper surface of the flange portion 25c of the roof panel 25. This provides a seal between the flange portion 25c of the roof panel 25 and the lower surface of the body portion 41.

The seal lip 42 is formed to protrude obliquely upward from an upper inward position of the body portion 41 and to extend over the entire length of the seal material 40. The seal lip 42 has a tip end of smooth, rounded shape. When the outer roof 31 is fixed from above, with the seal material 40 attached to the outer roof 31, a lower surface of the seal lip 42 elastically deforms through contact with the sound-absorbing waterproof sheet 32. Thus, the seal lip 42 is pressed against the sound-absorbing waterproof sheet 32 to secure sealing performance inwardly of the outer roof 31.

By forming the seal lip 42 to protrude obliquely upward as noted above, a drain groove 48 having a substantially triangular sectional shape can be formed above the seal lip 42. Thus, water entering from between a lower surface of the second tongue 47 and the outer roof 31 through the recess 41a is drained from the drain groove 48 forwardly of the vehicle.

The seal lip 43 of triangular sectional shape is formed to protrude inward from a lower inward position of the body portion 41 and to extend over the entire length of the seal material 40. When the outer roof 31 is fixed from above, with the seal material 40 attached to the outer roof 31, the seal lip 43 contacts an upper surface of the roof panel 25. This provides a seal inwardly of the outer roof 31 to stop water not stopped or absorbed by the seal lip 42 and sound-absorbing waterproof sheet 32 from entering the cab 14.

The seal lip 44 is formed to protrude obliquely upward from a middle outward position of the body portion 41 and to extend over the entire length of the seal material 40. The seal lip 44 has a tip end of smooth, rounded shape. When the outer roof 31 is fixed from above, with the seal material 40 attached to the outer roof 31, the tip end of the seal lip 44 elastically deforms through contact with the seal portion 21b of the door frame 21. Thus, the tip end of the seal lip 44 is pressed against the seal portion 21b of the door frame 21 to secure sealing performance outwardly of the outer roof 31.

By forming the seal lip 44 to protrude obliquely upward as noted above, a drain groove 49 having a substantially triangular sectional shape can be formed above the seal lip 44. Thus, water entering from between a lower surface of the first tongue 46 and the door frame 21 is stopped by the seal lip 44 and drained from the drain groove 49 forwardly of the vehicle.

The seal lip 45 is formed to protrude obliquely downward from a lower outward position of the body portion 41 and to extend over the entire length of the seal material 40. The seal lip 45 has a tip end of smooth, rounded shape for contacting the door frame 21. When the outer roof 31 is fixed from above, with the seal material 40 attached to the outer roof 31, the tip end of the seal lip 45 elastically deforms through contact with the seal portion 21b of the door frame 21. Thus, the tip end of the seal lip 45 is pressed against the seal portion 21b of the door frame 21. This provides a seal outwardly of the outer roof 31 to stop water not stopped by the seal lip 44 from entering the cab 14.

A drain groove 50 is defined by the seal lips 44 and 45 and door frame 21. Even when water not stopped by the seal lip 44 enters from between the seal lip 44 and door frame 21, the water is drained from the drain groove 50 forwardly of the vehicle.

The first tongue 46 extends outward from an upper outward position of the body portion 41 to cover a gap between the body portion 41 and the door frame 21 forming part of the cab frame 20. The first tongue 46 has a lower surface thereof formed to fit with the shape of the door frame 21, and an upper surface smoothly curved so that water may flow smoothly outward and downward. The first tongue 46 has a tip end of smooth, rounded shape. When the outer roof 31 is fixed from above, with the seal material 40 attached to the outer roof 31, the tip end of the first tongue 46 elastically deforms through contact with the seal portion 21b of the door frame 21 to secure sealing performance between the tip end of the first tongue 46 and the outer roof 31.

The second tongue 47 extends inward from the upper outward position of the body portion 41 to cover the outer roof 31 from above. The second tongue 47 has a lower surface thereof formed to fit with the shape of the outer roof 31, and an upper surface smoothly curved. The second tongue 47 has a tip end of smooth, rounded shape. When the seal material 40 is attached to the outer roof 31, the tip end of the second tongue 46 elastically deforms through contact with the outer roof 31 to secure sealing performance between the tip end of the second tongue 47 and the outer roof 31.

The seal material 40 is constructed as described above, and the outer roof 31 is fixed from above, with the seal material 40 attached to the outer roof 31. Then, the first tongue 46 covers, from above, the part of the door frame 21 located outwardly of the outer roof 31, to stop entry of water. Even if water enters from between the first tongue 46 and door frame 21, the seal lips 44 and 45 will doubly prevent the water from entering the cab 14. The entering water can be drained outside through the drain grooves 49 and 50.

On the other hand, inwardly of the outer roof 31, the second tongue 47 covers the outer roof 31 from above, to stop entry of water. Even if water enters from between the second tongue 47 and outer roof 31, the seal lips 42 and 43 will doubly prevent the water from entering the cab 14. The entering water can be drained outside through the drain groove 48. Part of the water flowing over the seal lip 42 and leaking inward from the drain groove 48 will be absorbed by the sound-absorbing waterproof sheet 32 without leaking into the cab 14.

Further, by fixing the outer roof 31 from above, the outer roof 31 itself, which is formed of resin, elastically deforms to a small extent. A restoring force from the elastic deformation of the outer roof 31 acts as a force to pushing downward the seal mount 31d bent downward. This secures sealing performance between the body portion 41 and flange portion 25c, and between the seal lip 43 and the upper surface of the roof panel 25.

A seal structure in a middle portion in the fore and aft direction of the outer roof 31 where the roof panels 25 are not present will be described with reference to FIG. 6, As shown in FIG. 6, when the outer roof 31 is fixed from above, with the seal material 40 attached to the outer roof 31, the tip end of the seal lip 42 formed in the upper inward position of the body portion 41 elastically deforms through contact with the sound-absorbing waterproof sheet 32. This secures sealing performance inwardly of the outer roof 31 even if water enters from between the second tongue 47 and outer roof 31 through the recess 41a.

Water entering from between the second tongue 47 and outer roof 31 through the recess 41 is drained forward or rearward of the vehicle through the drain groove 48 formed above the seal lip 42.

The tip end of the seal lip 44 formed in the middle outward position of the body portion 41 elastically deforms through contact with the seal portion 21b of the door frame 21. The tip end of the seal lip 45 formed in the lower outward position of the body portion 41 elastically deforms through contact with the frame receiver 21a of the door frame 21. Even if water enters from between the first tongue 46 and door frames 21, the seal lip 44 and seal lip 45 secure sealing performance in two positions outwardly of the outer roof 31.

Water entering from between the first tongue 46 and door frame 21 is drained forward or rearward of the vehicle through the drain groove 49 formed above the seal lip 44 and the drain groove 50 formed above the seal lip 45.

As described above, the outer roof 31 in the middle portion in the fore and aft direction is constructed to present a different sectional shape to the front and rear ends of the outer roof 31 having the roof panels 25 as shown in FIG. 5. With this construction, while fully securing seal performance between the outer roof 31 and door frames 21 at the front end and rear end of the outer roof 31 where water can enter easily, the outer roof 31 in the middle portion in the fore and aft direction, where water does not enter so easily as at the front end and rear end of the outer roof 31, is sealed without the roof panels 25. This simplifies the frame structure, thereby lightening the vehicle body and reducing manufacturing cost.

First Modified Embodiment of the Invention

In the above embodiment, the outer roof 31 with the seal materials 40 attached thereto is fixed to the cab frame 21 with bolts 35 from above. A different construction may be employed used for fastening and fixing the outer roof 31 with the seal materials 40 attached thereto to the cab frame 21 from above.

In the above embodiment, the seal materials 40 are used to seal gaps between outer roof 31 and door frame 21 at the opposite sides of the outer roof 31. It is possible to employ a different construction where the seal materials 40 seal gaps between the outer roof 31 and other frames constituting the cab frame 21. For example, the seal materials 40 may be attached over the entire circumference of the outer roof 31.

Second Modified Embodiment of the Invention

In the above embodiment, the seal lips 42-45, drain grooves 48-50 and the first and second tongues 46 and 47 have the described shapes. The seal lips 42-45, drain grooves 48-50 and the first and second tongues 46 and 47 of other shapes may be employed as long as similar functions are fulfilled.

Third Modified Embodiment of the Invention

In the above embodiment, the invention is applied to the seal structure of the cab 14 of the utility vehicle shown as an example of working vehicles. The invention is equally applicable to the seal structure of cabs 14 of other types of working vehicle, e.g. agricultural working vehicles such as tractors and combines, and construction working vehicles such as backhoes and wheel loaders.

What is claimed is:

1. A cab comprising:
   a cab frame for said cab;
   an outer roof configured to cover said cab frame from above and to be fastened to the cab frame from above;
   a seal mount protruding downwardly from an edge of said outer roof; and
   a seal material including a body portion having a recess for receiving said seal mount, a first tongue for covering said cab frame from above, a second tongue for covering said outer roof from above, a periphery of the body portion of the seal material having a seal lip for contacting said cab frame for sealing, and a drain groove for draining water entering between said seal material and said cab frame.

2. A cab as defined in claim 1, wherein said drain groove is formed by inclining an upper surface of said seal lip.

3. A cab as defined in claim 1, wherein said seal material has said seal lip and said drain groove formed on one surface of said body portion and has further seal lip and drain groove on an opposite side surface of said body portion.

4. A cab as defined in claim 1, wherein said seal material has at least three seal lips and at least three drain grooves.

5. A cab as defined in claim 1, wherein the lower edge of the seal mount includes a central portion that generally extends horizontally, a forward portion located forwardly of the central portion and inclined downwardly, and a rearward portion located rearwardly of the central portion and inclined downwardly in a side view, and wherein the seal material extends along the forward portion, the central portion, and the rearward portion of the seal mount so that portions of the seal material extending along the forward portion and the rearward portion of the seal mount facilitate draining of water.

6. A cab as defined in claim 1, wherein the lateral lower edges of the outer roof has a generally horizontal portion, and the seal mount extends forwardly beyond the generally horizontal portion of the outer roof to a region adjacent a windshield and the seal mount extends rearwardly beyond the generally horizontal portion of the outer roof in a side view.

7. A cab comprising:
   a cab frame for said cab;
   an outer roof configured to cover said cab frame from above and to be fastened to the cab frame from above;
   a seal mount protruding downwardly from an edge of said outer roof; and
   a seal material including a body portion disposed between said seal mount and said cab frame and having a recess for receiving said seal mount, a periphery of the body portion of the seal material having a seal lip for contacting said cab frame for sealing, and a drain groove for draining water entering between said seal material and said cab frame.

8. A cab as defined in claim 7, wherein said drain groove is formed by inclining an upper surface of said seal lip.

9. A cab as defined in claim 7, wherein said seal material has said seal lip and said drain groove formed on one surface of said body portion and has further seal lip and drain groove on an opposite side surface of said body portion.

10. A cab as defined in claim 7, wherein said seal material has a first tongue for covering said cab frame from above, and a second tongue for covering said outer roof from above.

11. A cab as defined in claim 7, wherein said seal material has at least three seal lips and at least three drain grooves.

12. A cab as defined in claim 7, wherein the lower edge of the seal mount includes a central portion that generally extends horizontally, a forward portion located forwardly of the central portion and inclined downwardly, and a rearward portion located rearwardly of the central portion and inclined downwardly in a side view, and wherein the seal material extends along the forward portion, the central portion, and the rearward portion of the seal mount so that portions of the seal material extending along the forward portion and the rearward portion of the seal mount facilitate draining of water.

13. A cab as defined in claim 7, wherein the lateral lower edges of the outer roof has a generally horizontal portion, and the seal mount extends forwardly beyond the generally horizontal portion of the outer roof to a region adjacent a windshield and the seal mount extends rearwardly beyond the generally horizontal portion of the outer roof in a side view.

* * * * *